Sept. 18, 1956  C. R. HANNA ET AL  2,763,450
PRESSURE SENSITIVE SYSTEMS AND APPARATUS
Filed Aug. 11, 1953
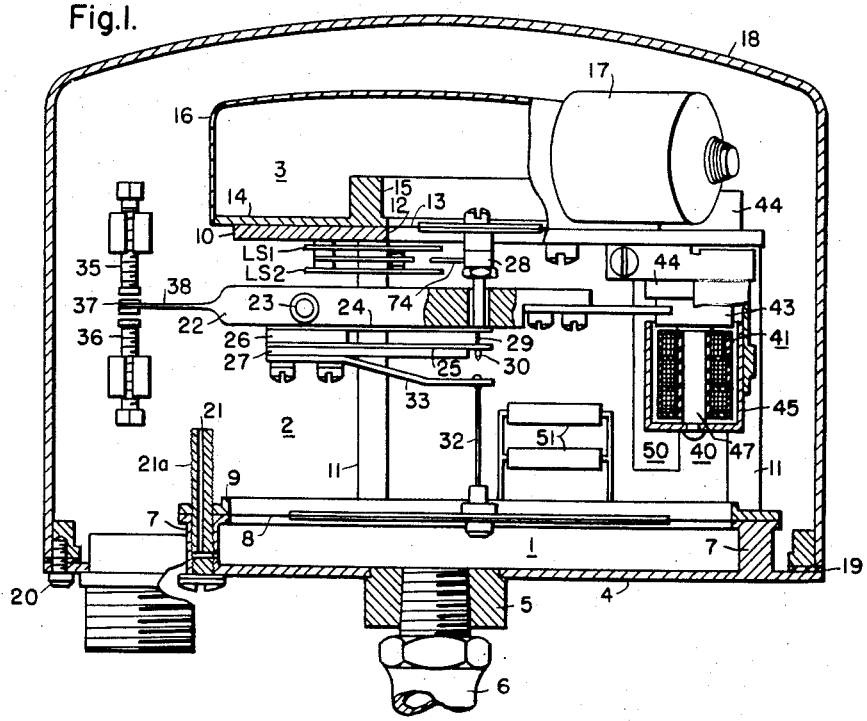
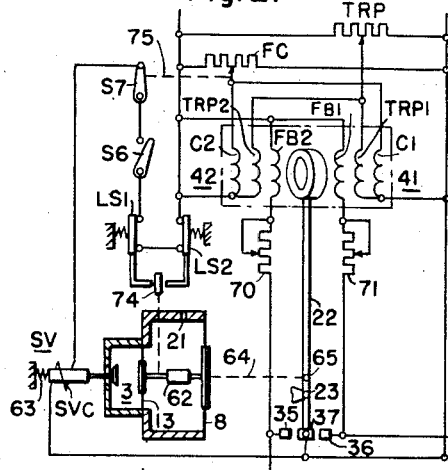
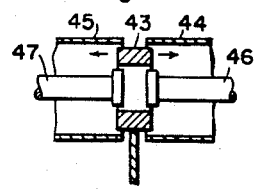
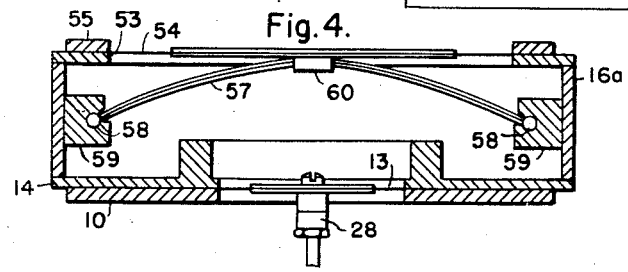
INVENTORS
Clinton R. Hanna, George R. Douglas
and Kirk A. Oplinger.
BY
Paul E. Friedemann
ATTORNEY

United States Patent Office 2,763,450
Patented Sept. 18, 1956

2,763,450

PRESSURE SENSITIVE SYSTEMS AND APPARATUS

Clinton R. Hanna and George R. Douglas, Pittsburgh, and Kirk A. Oplinger, Verona, Pa., assignors to Westinghouse Electric Corporation, East Pittsburgh, Pa., a corporation of Pennsylvania Application August 11, 1953, Serial No. 373,588

19 Claims. (Cl. 244—77)

This invention relates generally to fluid pressure sensitive apparatus and to systems embodying such apparatus.

More particularly, this invention is directed to a device responsive to changes in air pressure and to rates of change of air pressure which is applicable in an altitude control system for aircraft.

In the control of aircraft by means of automatic pilots, provision is usually made for maintaining the craft at a predetermined altitude in flight. Varieties of devices and systems have been proposed and utilized in this respect. In detecting altitude changes, some of these systems utilize devices sensitive to changes in pitch attitude which indicates in a certain degree a condition in which the altitude of the aircraft may change, and in other instances pressure sensitive devices are utilized, such as a sealed bellows, which may be preloaded to be instrumental in maintaining a fixed altitude or are controlled by means of a valve so that air pressure at altitude may be trapped therein. In either case, the calibration is such that the bellows' deflection or the bellows' force is an indication of a change in altitude.

An improved system for maintaining aircraft at fixed altitude is disclosed in a copending application of Clinton R. Hanna et al., Serial No. 785,986, now U. S. Patent 2,686,022, filed on November 14, 1947, entitled "Gyroscope Control Systems and Apparatus for Controlling Dirigible Craft" and assigned to the assignee of this invention.

In the aforesaid copending application the altitude control comprises a pair of chambers, one chamber is controlled by a spring-opened, solenoid-closed valve which is closed at a predetermined altitude to trap the air pressure at altitude in the chamber. The other chamber, called a rate chamber, is provided with a restricted opening which permits a restricted flow of air into and out of the chamber in dependence of pressure differences appearing across the restricted opening. Each of these chambers is provided with a movable part, for example a flexible diaphragm which is subject to air pressure. These diaphragms are connected by a mechanical linkage, the movement of which controls an electrical pickoff which in turn controls the elevator channel of the autopilot to thereby control the elevators. In this system, the altitude chamber functions as an absolute altitude reference and hence provides a sense which tends to return the aircraft to the predetermined altitude. The rate chamber responds to rates of change of pressure and, hence, of altitude and the deflection of its diaphragm and the force of this diaphragm is indicative of the rate at which altitude is changing. This anticipation of altitude change provides a stimulus of such sense and magnitude for controlling the elevators of the aircraft as to minmize excursions of the aircraft in elevation. The combined effect of the diaphragm deflections, therefore, provides an improvement over existing controls, while maintaining such advantages of the pressure sensitive system as have existed.

One object of this invention is to provide a pressure sensitive apparatus which is simple with respect to operational requirements and positive in operation.

Another object of this invention is to provide a pressure sensitive apparatus which is compact and which may be easily manufactured and assembled.

A more specific object of this invention is to provide a pressure sensitive apparatus involving an altitude chamber and a rate chamber in which the response of the altitude chamber is delayed according to the time required for pressure change in the rate chamber.

A further object of this invention is to provide a pressure sensitive apparatus of the character referred to in the preceding object in which response to changes in the ambient temperature are minimized.

The foregoing statements are merely illustrative of the various aims and objects of this invention. Other objects and advantages will become apparent from a study of the following disclosure when considered in conjunction with the accompanying drawings, in which:

Figure 1 is a schematic sectional view of a pressure sensitive apparatus embodying the principles of this invention;

Fig. 2 is a diagrammatic illustration of the application of a pressure sensitive apparatus, embodying the principles illustrated in Fig. 1, in the elevator control channel of an aircraft flight control system;

Fig. 3 is a sectional view illustrating a detail of the electromagnetic biasing system utilized in this invention; and Fig. 4 is a schematic sectional view of a temperature compensated altitude chamber.

The principles of this invention are schematically illustrated in the embodiment of this invention shown in Fig. 1. This is a combination of three chambers in one unit including a static chamber 1, a rate chamber 2 and an altitude chamber 3.

This assembly comprises a base plate 4 provided with an internally threaded bushing 5 which opens into the static chamber 1 and which receives a threaded tubing connector 6 adapted for connection to the static pressure line of the aircraft. The base plate 4 is provided with an integral vertical ring shaped flange 7 over the upper edges of which a flexible diaphragm 8 is disposed and sealed thereover by means of a clamping ring 9.

A base plate 10, forming a part of the altitude chamber 3, is mounted on the top of vertical support rods 11 which are secured to the base plate 4. Base plate 10 is provided with an opening 12 which is sealed by means of a flexible diaphragm 13. This diaphragm is secured by means of a plate 14 which is placed thereover and which is provided with an opening 15 aligned with the opening 12 in the base plate 10. A cover 16 is sealed about the edge of plate 14 and defines the volume of the altitude chamber. This chamber communicates with the fluid pressure in the rate chamber through a solenoid valve 17, the details of which are not shown but which is provided with a spring opened and solenoid closed valve member controlling an opening into the altitude chamber. The assembly is closed or covered by means of a cover 18 which seats on a gasket 19 about the marginal edge of the base plate 4 and which is secured in this position by means of a plurality of screws, one of which appears at 20. The volume defined within cover 18 is the rate chamber.

Airflow into and out of the rate chamber is controlled by an airflow restricting opening such as the capillary opening 21 in screw 21a. This screw is threaded through a hole in the flange 7 defining the wall of the static chamber and the capillary opening or orifice 21 provides communication between the static and rate chambers. It will be appreciated that other types of restricted openings may be used to limit flow rates.

The forces, due to displacement of rate diaphragm 8 and altitude diaphragm 13 with pressure changes, are transmitted to a balanced armature assembly 22 which is pivotally mounted about a fixed pivot 23. In the case of the altitude diaphragm, the forces transmitted are applied through a pair of loaded springs 24 and 25 which are secured to the bottom side of the armature assembly and spaced from each other by means of a spacing block 26. These springs are confined between the bottom side of armature assembly 22 and a flat support 27. The free ends of the spring are engaged by means of a prod 28 which is secured to and projects vertically downwardly from the altitude diaphragm 13. The bottom end of prod 28 abuts the free end of spring 24 and a small rod 29 extending from the end of prod 28 through both of the loaded springs is connected to loaded spring 25 by a washer 30 which is secured to the end thereof.

With this arrangement, it will be observed that downward deflection of the altitude diaphragm drives the end of prod 28 against the loaded spring 24, whereas upward deflection of the altitude diaphragm drives the washer 30 upwardly against the force of load spring 25. Thus, for either direction of displacement of the altitude diaphragm, the motion or the force is transmitted to the balanced armature assembly through the loaded spring at a point displaced from the fixed armature pivot 23. The use of the loaded spring limits the altitude diaphragm forces which may be applied to the armature assembly 22 to values which may, for instance, produce no more than 5° climb or dive regardless of diaphragm force or displacement. Of course, the degree of climb or dive may be set to any desired value to meet operational requirements.

In the case of the rate diaphragm, the connection to the armature assembly is obtained along a line of action coaxial with the line of action of prod 28 by means of a push rod 32 connected to an arm 33 secured with the spacing block 26 and loaded spring assembly at the bottom side of the armature. While this specific disposition of the prod 28 and the push rod 32 is utilized in this instance, due to the relative sizes of the respective diaphragms, it will be appreciated that the arms may be varied in whatever sense needed to obtain the proportioning of torques due to forces of the respective diaphragms.

Suitable electrical pickoff means is utilized to detect the angular displacement of the balanced armature assembly due to torques acting thereon as a result of diaphragm deflection. Such electrical pickoff means may be any one of a variety of types including carbon piles, magnetostrictive devices, electromagnetic devices and a contact type of pickoff shown.

The arrangement illustrated includes respective adjustable stationary contact assemblies 35 and 36 adapted for selective engagement by a movable contact 37 mounted at the end of a flexible arm 38 projecting from the end of the balanced armature assembly. Such a contact assembly as shown in Fig. 2, which will be described hereinafter, is utilized to control the elevator control system of the aircraft. Alternatively, the output of such an electrical pickoff may be utilized to control any suitable instrumentality including visual types of indicators useful in indicating or controlling the altitude of the aircraft.

The movement of the armature assembly 22 is further controlled by means of an electromagnetic biasing system, generally designated 40, which comprises oppositely disposed biasing coil systems 41 and 42 cooperating with a common armature 43 connected to the end of the armature opposite from the electrical pickoff system. This biasing coil system is controlled from a number of sources, to be described in connection with Fig. 2, and an important feature of the arrangement is represented in the use of an overlapping gap core and armature assembly so that minimum variation in the airgap dimension between the stationary and movable parts of the magnetic circuit results from displacement of the armature with tilting of the balanced armature assembly about the fixed pivot 23.

The details of this magnetic circuit are fragmentarily illustrated in Fig. 3, wherein in the interest of simplicity, the biasing coils are not shown. In this illustration it will be observed that the magnetic circuit comprises respective coil housings 44 and 45 which are coaxially disposed in opposed relationship. These housings are joined at their bases to respective oppositely disposed cores 46 and 47, the ends of which are spaced apart a sufficient distance to minimize flux linkage thereacross. The movable armature of this assembly is ring shaped and disposed in a position about the respective cores in a position straddling the air gap between the ends of the cores.

In view of the length of the moment arm about which the movable armature swings and in view of the very small angular displacement of the balanced armature assembly between positions engaging the respective contact pickoffs, the armature travel, for all practical purposes, in each direction, may be regarded as linear, as indicated by the arrows at opposite sides of the armature in Fig. 3. Hence, it will be appreciated that while a change in the area of the respective air gaps results from displacement of this armature in the magnetic circuit in the directions indicated by the arrows, the dimensions of the radial air gaps between the inner face of the armature ring and respective cores 46 and 47 and the dimensions of the radial air gaps between the outer face of the armature and respective coil housings 44 and 45, are not changed. Hence, the flux density is essentially independent of armature displacement and is, therefore, proportional to the coil current resulting in forces acting on the armature which are essentially linear with respect to coil current. Thus, the response of this device to control currents applied to the respective coils of the biasing magnet system is made linear.

System of this general type are inherently responsive to changes in ambient temperature. Two means are available for compensating ambient temperature variations, one of these is illustrated in Fig. 1, wherein a thermostat 50 is utilized to detect excursions in temperature in the rate chamber 2. Heating is accomplished by means of space heaters 51, the current to these space heaters being controlled by the thermostat 50 in any conventional manner. The temperature may be maintained at any selected temperature which is known to be higher than the temperature which will be found in any expected environment, in which case the space heaters under the control of the thermostat will be utilized to maintain the temperature of the altitude chamber at this elevated temperature. Since the temperature is maintained substantially constant, variations in air pressure with ambient temperature excursions are minimized to avoid disturbing the calibration of the device.

Another way in which compensation for temperature response of the altitude change may be minimized is illustrated in Fig. 4. In this embodiment of the invention, the altitude diaphragm 13 is secured between respective plates 10 and 14 in essentially the same manner illustrated in Fig. 1. However, the upper side of the altitude chamber cover 16a is provided with an opening 53 over which a diaphragm 54 is sealed by means of a clamping ring 55. This diaphragm is preferably relatively stiff so that deflections thereof with pressure changes may be minimized. Deflection of this diaphragm to vary the volume of the altitude chamber in dependence of ambient temperature changes may be accomplished by means of a curved flat bimetallic element 57, the ends of which are pivotally anchored at 58 in supports 59 secured to the sides of cover 16a. Bimetallic element 57 curves upwardly and is secured to the bottom side of the altitude diaphragm by means of a clamp 60. In this arrangement the strip of metal on the convex side of the bimetallic element will have the higher coefficient of thermal expansion.

Hence, when the ambient temperature decreases, the curvature of the bimetallic element will tend to decrease, that is the bimetallic element will tend to flatten out. The resulting force exerted through the clamp 60 on the diaphragm 54 draws the diaphragm downwardly into the altitude chamber reducing its volume in a sense to tend to maintain the pressure condition existing at a given altitude and temperature. Conversely, when the ambient temperature increases above that for which the device is calibrated, the bimetallic element bows upwardly driving the diaphragm 54 upwardly and increasing the volume of the altitude chamber to again tend to maintain the pressure condition existing at the given altitude and temperature. A disc type bimetallic element may be used in place of the flat strip element shown. It will be appreciated that bimetallic arrangements, other than those mentioned, may be utilized to deflect the diaphragm 54. Additionally, other devices which change their volume in dependence of temperature changes may be utilized to control the volume of such a chamber.

A modified showing of the pressure sensitive apparatus of this invention is illustrated in the application in Fig. 2. In this illustration the altitude chamber is mounted so that its movable part, such as a diaphragm 13 or a bellows, is subject to the pressure in the rate chamber. However, in this illustration, the altitude chamber inlet is mounted outside the rate chamber rather than inside as illustrated in Fig. 1.

The two diaphragms, 13 and 8, are connected by a loaded spring assembly, generally designated 62. The details of this assembly are not illustrated since they may be conventional. The principle of this loaded spring assembly, however, is the same as that illustrated in Fig. 1, wherein a resilient preloaded spring coupling of the altitude diaphragm 13 to the rate diaphragm 8 is achieved.

The solenoid valve which controls the sealing of the altitude chamber 3 is designated SV and comprises a biasing spring 63 which biases the valve to open position and a solenoid having a coil SVC which when energized is instrumental in closing the solenoid valve and sealing the altitude chamber. In this diagrammatic showing the balanced armature assembly 22 is mounted outside the rate chamber in the interest of drawing convenience, and is connected to the mechanical connection 62 between the diaphragms by the mechanical linkage 64 between the rate diaphragm 8 and a point 65 on the balanced armature 22 which is displaced from the fixed pivot 23. It will be appreciated that the mechanical principles herein involved correspond to those illustrated in Fig. 1 in all essential respects.

The system illustrated in Fig. 2 may be identified as a vertical rate control incorporating an altitude control, and is generally designated Altitude-Rate Control system. It includes an elevator booster system having a mechanical output represented in the mechanical linkage 67, shown in dotted line, which is connected to the horn 68 of the elevator E of the aircraft. This booster system may be any suitable type adapted for control by the electrical output of an electrical pickoff such as that involving the contacts 35, 36 and 37, or any other suitable electrical pickoff, and may be of the type illustrated in the aforesaid copending application of C. R. Hanna. Alternatively, the electrical pickoff may be connected to control electromagnetic pilot valves in a hydraulic system (not shown) having a power piston operable through the mechanical linkage 67 to drive the elevator E. A type of hydraulic system which is suitable for this application appears in the copending application of C. R. Hanna et al. Serial No. 317,215, filed October 28, 1952, entitled "Hydraulic Apparatus" and assigned to the assignee of this invention.

The biasing magnet system comprising electromagnets 41 and 42, seen in Fig. 1, is diagrammatically represented in this illustration. The electromagnet 41 comprises an assembly of three coils including a command coil C1, a trim coil TRP1 and a feedback coil FB1. Coils C2, TRP2, and FB2 of electromagnet 42 correspond respectively to the previously mentioned coils.

The coils C1 and C2 are connected as adjacent legs in an electrical bridge circuit including tapped portions of a flight controller potentiometer FC which may be manually operated by the pilot of the aircraft or may be operated automatically according to a predetermined pattern. The trim coils TRP1 and TRP2 are also connected as adjacent legs of an electrical bridge circuit including in its remaining adjacent legs the tapped portions of a trim potentiometer TRP. This potentiometer is utilized to balance the circuit during calibration. The feedback coils FB1 and FB2 are connected in parallel across the direct current power supply indicated, which also energizes the aforesaid bridge circuits. Coil FB2 is connected in series with stationary contact 35 and movable contact 37 across the power supply and coil FB1 is connected in series with the stationary contact 36 and movable contact 37 across the power supply. Each of these series circuits may include respective calibrating resistors 70 and 71 for the purpose of establishing the proper feedback ampere turns.

This feedback of a portion of the electrical pickoff output current to the respective feedback or bias coils FB1 and FB2 is done in a negative sense so that the contact current may be proportional to the net torque acting on the balanced armature assembly. The arrangement is such that upon the occurrence of deflection of the diaphragms and the application of torque to the balanced armature assembly 22 and closing of one of the sets of contacts, a current is caused to flow in one of the feedback or biasing coils to bias the armature in an angular direction opposite to that due to diaphragm deflection. The contacts are thereby caused to hover in such a way that the average output current is proportional to the algebraic sum of the deflections or forces of the diaphragm and is, therefore, variable depending upon the pressure conditions to which the diaphragms are subjected. Hence, the elevator is properly controlled for any pressure condition which may exist.

The control of the solenoid valve may be accomplished in a series circuit including respective limit switches LS1 and LS2 which are actuated by a member 74 projecting from the side of prod 28, as seen in Fig. 1. These switches are normally closed and when the altitude diaphragm 13 is displaced in either direction from neutral position in an excessive amount due to high rates of change of pressure, one or the other of these series-connected switches is opened to deenergize the coil SVC of the solenoid valve thereby permitting the valve to open due to the force of spring 63. A series-connected manually operated switch S6 is provided in this circuit so that the altitude rate control may be switched in at the desired altitude.

Assuming that the aircraft is to be automatically maintained at fixed altitude, the switch S6 is closed, energizing the solenoid valve SVC and sealing the altitude chamber at the selected altitude. If, for any reason, during this mode of operation the aircraft should tend to lose altitude, a pressure differential appears across the orifice in the rate chamber. This pressure differential is sensed by the rate diaphragm.

Since the ambient pressure increases with loss of altitude, the rate diaphragm is deflected inwardly applying a counterclockwise torque, as viewed, to the balanced armature assembly. This closes contacts 36 and 37 establishing an output at the electrical pickoff in such sense as to apply up elevator to correct the impending change in elevation of the aircraft. Upon closing of these named contacts, coil FB1 is energized which biases the armature assembly in a clockwise direction tending to open the contacts. Equilibrium between the electrical torque and the mechanical torque on the armature is quickly reached resulting in an average electrical output current at the contacts which is proportional to the rate of change of pressure plus any pressure change which may have occurred which is sensed by the altitude diaphragm.

The craft is restored to that pressure environment for which the altitude chamber affects a control. At this pressure environment the contacts are restored to neutral position and the system function ceases. As a practical matter, however, it will be appreciated that the system continuously monitors air pressure transient conditions to maintain the craft at a fixed elevation.

The loaded spring 62 limits the force exerted by the altitude diaphragm upon link 64 and insures that a large altitude error will not produce an unsafe pitch attitude of the aircraft.

If the pilot decides to change altitude, the flight controller is operated from neutral or detent position. This displaces the movable tap on the flight controller potentiometer FC in the direction selected. Such displacement of the tap unbalances the ampere turns of respective command coils C1 and C2. At the same time, by means of a mechanical connection 75, a switch S7, also connected in series with the coil of the solenoid valve, is opened which opens the altitude chamber to ambient pressure. The unbalanced ampere turns of command coils C1 and C2 apply a proportional net biasing torque to the balanced armature assembly 22. The magnitude of this unbalanced torque controls the rate of climb or dive.

With a change in elevation of the aircraft the force of the rate diaphragm applies a mechanical torque to the balanced armature assembly in a sense opposite to the biasing electrical torque. When equilibrium between these two torques is reached, the elevator is controlled in such a way as to maintain the rate of climb or dive set in at the flight controller. It will be appreciated that the angular position of the elevator may vary throughout this operation even though the movable tap on the flight controller remains in a fixed position since, as indicated, this position indicates a rate of elevation change.

Thus, initially, the elevator will be deflected in such a way as to rapidly initiate a change in pitch attitude to that which will product the proper rate of change of elevation. If the elevator were left in this fixed position, the rate of change of elevation would exceed that set in at the flight controller. However, as the rate of change of pressure increases, the torque due to the diaphragm force overbalances the torque due to the electromagnetic bias. As a consequence, the position of the contacts is reversed, reversing the elevator drive to diminish the angular deflection of the elevator. This operation continues until equilibrium among the several parameters is reached. When the flight controller is returned to neutral or detent position, the circuit for the solenoid valve is completed which seals the altitude chamber, the system then functions to level the craft off at the new elevation.

The proposition of disposing the altitude chamber so that the movable part thereof is subject to fluid pressure in the rate chamber delays the response of the altitude diaphragm so that its time constant corresponds to the time constant of the rate diaphragm. This delay while not absolutely essential from the standpoint of overall system stability at low altitudes, since it can be kept small, for instance in the order of one-third of a second, is very important at higher altitudes since the delay of the rate chamber increases with altitude and may be as large as two seconds at 50,000 feet. This arrangement has considerable merit because the delay in the altitude response permits a higher overall system stiffness than would be possible if the delay occurred only in the rate response.

Additionally, it should be noted that by the disclosed disposition of the rate of change of pressure and change of pressure sensitive components, the delay in the pressure response changes automatically with the time delay of the rate of change of pressure response and does not require auxiliary means for changing the delay with altitude as would be the case if the altitude diaphragm were not subject to the pressure in the rate chamber.

The benefits derived from the temperature compensating features herein disclosed are items of some importance with respect to overall system performance. As a general rule, some form of temperature compensation whether it be a type for maintaining the pressure sensitive system at substantially constant temperature or of the general volume compensating type indicated in Fig. 4, wherein the volume of the altitude chamber is compensated for temperature change, must be provided. The more satisfactory solution to this problem appears to be that of compensating the pressure change by varying the volume of the chamber, since this method eliminates the warm-up time.

Although several embodiments of the pressure sensitive apparatus have been herein disclosed, it will be appreciated that various modifications of this apparatus, both in its details and in its organization as well as its application in a system, may be realized without departing from the spirit and scope of this invention. Accordingly, it is intended that the foregoing disclosure together with the illustrations in the drawings shall be considered only as illustrative of the principles of this invention and are not to be construed in a limiting sense.

We claim as our invention:

1. Pressure sensitive apparatus comprising, a first chamber having a part which moves in response to variations in fluid pressure and having a restricted opening therein permitting limited ingress and egress of fluid with variations in fluid pressure, a sealed chamber having a part which moves in response to variations in fluid pressure, said sealed chamber being disposed within said first chamber, a valve connected with said sealed chamber for opening and closing said sealed chamber, a mechanical connection between said movable parts, and means responsive to movement of said mechanical connection.

2. Pressure sensitive apparatus comprising, a first chamber having a part which moves in response to variations in fluid pressure and having a restricted opening therein permitting limited ingress and egress of fluid with variations in fluid pressure, a sealed chamber having a part which moves in response to variations in fluid pressure, said sealed chamber being disposed within said first chamber, a valve connected with said sealed chamber, resilient means biasing said valve to open position, electromagnetic means for moving said valve to closed position, normally closed limit switches for energizing said electromagnetic means, said limit switches being opened by said movable part of said sealed chamber, a mechanical connection between said movable parts, and means responsive to movement of said mechanical connection.

3. Pressure sensitive apparatus comprising, a first chamber having a part which moves in response to variations in fluid pressure and having a restricted opening therein permitting limited ingress and egress of fluid with variations in fluid pressure, a sealed chamber having a part which moves in response to variations in fluid pressure, said sealed chamber being disposed within said first chamber, a static chamber enclosing said moving part of said first chamber, means providing a connection into said static chamber for admitting ambient fluid pressure thereto, a mechanical connection between said movable parts, and means responive to movement of said mechanical connection.

4. Pressure sensitive apparatus comprising, a static chamber having an opening therein for admitting ambient fluid pressure, a rate chamber having a restricted opening therein communicating between said static and rate chambers and having a movable part subject to fluid pressure in said static chamber, a sealed chamber having a movable part subject to fluid pressure in said rate chamber, mechanical means connecting said movable parts, and means responsive to movement of said mechanical means.

5. Pressure sensitive apparatus comprising, a rate chamber having a restricted opening therein permitting limited ingress and egress of fluid with variations in fluid pressure and having a part which moves in response to rates of change of fluid pressure, a sealed chamber having a movable part subject to fluid pressure in said rate chamber, mechanical means connected to both movable parts to be moved thereby, and an electrical pickoff connected with and actuated by said mechanical means.

6. Pressure sensitive apparatus comprising, a rate chamber having a movable part subject to fluid pressure and having a restricted opening therein permitting limited ingress and egress of fluid with variations in fluid pressure, a sealed chamber having a movable part subject to fluid pressure in said rate chamber, and electrical pickoff means having mechanical connections to both movable parts.

7. Pressure sensitive apparatus comprising, a rate chamber having a movable part subject to fluid pressure and having a restricted opening therein permitting limited ingress and egress of fluid with variations in fluid pressure, a sealed chamber having a movable part subject to fluid pressure in said rate chamber, a pivoted bar having a connection with both said movable parts, and electrical means having a connection with said pivoted bar to be moved thereby.

8. Pressure sensitive apparatus comprising, a rate chamber having a movable part subject to fluid pressure and having a restricted opening therein permitting limited ingress and egress of fluid with variations in fluid pressure, a sealed chamber having a movable part subject to fluid pressure in said rate chamber, a movable bar having a connection with both said movable parts, and electrical pickoff means having a connection with said movable bar to be controlled thereby.

9. Pressure sensitive apparatus comprising, a rate chamber having a movable part subject to fluid pressure and having a restricted opening therein permitting limited ingress and egress of fluid with variations in fluid pressure, a sealed chamber having a movable part subject to fluid pressure in said rate chamber, a movable bar having a connection with both said movable parts, electrical pickoff means having a connection with said movable bar to be controlled thereby, and electromagnetic biasing means having a movable member connected to said movable bar to apply force to said bar upon energization of said electromagnetic means.

10. Pressure sensitive apparatus comprising, a rate chamber having a movable part subject to fluid pressure and having a restricted opening therein permitting limited ingress and egress of fluid with variations in fluid pressure, a sealed chamber having a movable part subject to fluid pressure in said rate chamber, a movable bar having a connection with both said movable parts, electrical pickoff means having a connection with said movable bar to be controlled thereby, electromagnetic biasing means having a movable member connected to said movable bar to apply force to said bar upon energization of said electromagnetic means, and circuit connections between the output of said electrical pickoff and said electromagnetic biasing means for energizing said electromagnetic biasing means in dependence of the electrical output of said electrical pickoff.

11. Pressure sensitive apparatus comprising, a rate chamber having a movable part subject to fluid pressure and having a restricted opening therein permitting limited ingress and egress of fluid with variations in fluid pressure, a sealed chamber having a movable part subject to fluid pressure in said rate chamber, a movable bar having a connection with both said movable parts, electrical pickoff means having a connection with said movable bar to be controlled thereby, electromagnetic biasing means having a movable member connected to said movable bar to apply force to said bar upon energization of said electromagnetic means, and a circuit between the output of said electrical pickoff and said electromagnetic biasing means for energizing said electromagnetic biasing means in dependence of the electrical output of said electrical pickoff, said electromagnetic biasing means being disposed with respect to said movable bar so that said movable member applies a force to said bar to bias said bar in a sense opposite to the bias on said bar due to said movable parts.

12. Pressure sensitive apparatus comprising, a rate chamber having a movable part subject to fluid pressure and having a restricted opening therein permitting restrained ingress and egress of fluid with variations in fluid pressure, a sealed chamber having a movable part subject to fluid pressure in said rate chamber, a movable bar having a connection with both movable parts and movable in each of two directions depending upon the sense of the algebraic sum of the forces of said movable parts, a movable armature connected with said movable bar, respective electromagnets disposed on opposite sides of said movable armature and in flux linkage therewith to bias said armature in opposite directions depending upon which electromagnet is energized, an electrical pickoff actuated by said movable bar, and circuit connections between the output of said electrical pickoff and said electromagnets to effect selective energization of said electromagnets depending upon the direction of movement of said movable bar.

13. Pressure sensitive apparatus comprising, a rate chamber having a movable part subject to fluid pressure and having a restricted opening therein permitting restrained ingress and egress of fluid with variations in fluid pressure, a sealed chamber having a movable part subject to fluid pressure in said rate chamber, a movable bar connected with said movable part associated with said rate chamber, a resilient connection between said movable bar and said movable part of said sealed chamber, and means responsive to movement of said movable bar.

14. Pressure sensitive apparatus comprising, a rate chamber having a movable part subject to fluid pressure and having a restricted opening therein permitting restrained ingress and egress of fluid with variations in fluid pressure, a sealed chamber having a movable part subject to fluid pressure in said rate chamber, a movable bar connected with one of said movable parts, a resilient connection between said movable bar and the remaining movable part, and means responsive to movement of said movable bar.

15. Pressure sensitive apparatus comprising, a rate chamber having a movable part subject to fluid pressure and having a restricted opening therein permitting restrained ingress and egress of fluid with variations in fluid pressure, a sealed chamber having a movable part subject to fluid pressure in said rate chamber, a pivotally mounted bar, a push-pull rod connecting said bar to one movable part, loaded spring means connecting said pivoted bar to the other movable part, and means responsive to angular movement of said pivotally mounted bar.

16. A system for controlling an elevator surface of an aircraft comprising, a rate chamber having a movable part subject to air pressure variations and having an airflow restricting opening therein permitting airflow therethrough at limited volume rates with variations in air pressure, a sealed chamber having a movable part subject to air pressure in said rate chamber, a movable bar having a connection with both said movable parts, an electrical pickoff connected to and controlled by said movable bar and having an electrical output circuit, electromagnetic biasing means having a movable member connected to said movable bar to apply forces thereto, an electrically controlled booster system connected to said elevator to drive said elevator, and circuit means connecting the electrical output circuit of said electrical pickoff to said electromagnetic biasing means and to said electrically controlled booster system.

17. A system for controlling an elevator surface of an aircraft comprising, a rate chamber having a movable part subject to air pressure variations and having an airflow restricting opening therein permitting airflow therethrough at limited volume rates with variations in air pressure, a sealed chamber having a movable part subject to air pressure in said rate chamber, a movable bar having a connection with both said movable parts, an electrical pickoff connected to and controlled by said movable bar and having an electrical output circuit, electromagnetic biasing means having a movable member connected to said movable bar to apply forces thereto, an electrically controlled booster system connected to said elevator to drive said elevator, circuit means connecting the electrical output circuit of said electrical pickoff to said electrically controlled booster system, a movable controller producing electrical signals depending upon movement thereof, and circuit connections between said controller and said electromagnetic biasing means for controlling said biasing means by movement of said controller.

18. A system for controlling an elevator surface of an aircraft comprising, a rate chamber having a movable part subject to air pressure variations and having an airflow restricting opening therein permitting airflow therethrough at limited volume rates with variations in air pressure, a sealed chamber having a movable part subject to air pressure in said rate chamber, a movable bar having a connection with both said movable parts, an electrical pickoff connected to and controlled by said movable bar and having an electrical output circuit, electromagnetic biasing means having a movable member connected to said movable bar to apply forces thereto, an electrically controlled booster system connected to said elevator to drive said elevator, circuit means connecting the electrical output circuit of said electrical pickoff to said electromagnetic biasing means and to said electrically controlled booster system, a movable controller producing electrical signals upon movement thereof, and circuit connections between said controller and said electromagnetic biasing means for controlling said biasing means by movement of said controller.

19. Pressure sensitive apparatus comprising, a rate chamber having a movable part subject to air pressure variations and having an airflow restricting opening therein permitting restricted airflow therethrough with air pressure variations, a sealed chamber having a movable part subject to air pressure in said rate chamber, temperature sensitive means associated with said sealed chamber for minimizing air pressure variations in said sealed chamber with changes in ambient temperature, and means responsive to the algebraic sum of movements of said movable parts.

References Cited in the file of this patent

UNITED STATES PATENTS

| | | |
|---|---|---|
| 2,159,703 | Koch | May 23, 1939 |
| 2,358,803 | Hanson et al. | Sept. 26, 1944 |
| 2,445,335 | Philbrick et al. | July 20, 1948 |
| 2,526,669 | Kellogg II et al. | Oct. 24, 1950 |
| 2,568,226 | Drake | Sept. 18, 1951 |
| 2,591,938 | Holliday | Apr. 8, 1952 |
| 2,597,077 | Douglas | May 20, 1952 |
| 2,597,892 | Nash | May 27, 1952 |
| 2,638,288 | Hanna | May 12, 1953 |
| 2,652,859 | Murphy | Sept. 22, 1953 |
| 2,727,705 | Rasmussen et al. | Dec. 20, 1955 |